(12) United States Patent
Nishio et al.

(10) Patent No.: US 7,862,382 B2
(45) Date of Patent: Jan. 4, 2011

(54) MEMORY CARD CONNECTOR

(75) Inventors: Atsushi Nishio, Tokyo (JP); Soichi Takagi, Tokyo (JP); Isao Suzuki, Tokyo (JP); Satoshi Aoki, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 12/461,968

(22) Filed: Aug. 28, 2009

(65) Prior Publication Data

US 2010/0055949 A1 Mar. 4, 2010

(30) Foreign Application Priority Data

Aug. 29, 2008 (JP) ............................. 2008-222545

(51) Int. Cl.
*H01R 24/00* (2006.01)

(52) U.S. Cl. ...................... 439/630; 439/159

(58) Field of Classification Search ................ 439/159, 439/160, 630, 633, 636, 946
See application file for complete search history.

(56) References Cited

U.S. PATENT DOCUMENTS

| | | | |
|---|---|---|---|
| 6,896,555 B1 | 5/2005 | Su et al. | |
| 7,207,814 B2 * | 4/2007 | Chen et al. | 439/159 |
| 7,278,866 B1 * | 10/2007 | Van der Steen | 439/159 |
| 7,381,069 B2 * | 6/2008 | Saito et al. | 439/159 |
| 7,435,115 B2 * | 10/2008 | Kiryu et al. | 439/159 |
| 2005/0208804 A1 | 9/2005 | Kikuchi et al. | |

FOREIGN PATENT DOCUMENTS

JP 2003-86293 A 3/2003

* cited by examiner

*Primary Examiner*—Thanh-Tam T Le
(74) *Attorney, Agent, or Firm*—The Nath Law Group; Jerald L. Meyer; Jonathan A. Kidney (57) ABSTRACT

A memory card connector is able to insert and remove a memory card (200) without leaving marks of insertion and removal on the memory card (200), prevent the memory card from popping out when the memory card is inserted and removed and enable miniaturization at ease with a simple configuration. In this connector (100), by the side of a container (104) in which the memory card (200) is inserted, a slider (150) that has a lock claw part (155) engaging with a notch part (220) formed on the side of the memory card (200) is arranged movable in the longitudinal direction and swingable in a location at a card insertion slot end which is a location the memory card (200) is inserted halfway. The slider (150) is urged in the direction of removal by a coil spring (160), and this urge is suppressed by a slider pressuring piece (122) which presses the slider (150) from above and claw pressing piece (128) that presses the slider (150) located in a location at the card insertion slot end toward the memory card (200).

5 Claims, 8 Drawing Sheets

MEMORY CARD CONNECTOR

CROSS REFERENCE TO RELATED APPLICATIONS

This application is entitled to the benefit of Japanese Patent Application No. 2008-222545, filed on Aug. 29, 2008, the disclosure of which including the specification, drawings and abstract is incorporated herein by reference in its entirety.

TECHNICAL FIELD

The present invention relates to a memory card connector that holds an inserted memory card in the mounting location.

BACKGROUND ART

Card-shaped memory cards are known as a type of recording medium that stores image data taken by digital cameras, recording medium that stores digital music data played on portable music players, and recording medium that stores created text data.

In a memory card, a flash memory is accommodated in a small resin casing that has an appearance of a thin and flat shape and that has a plurality of electrodes, which are electrically connected and are aligned in parallel at an end part of the casing.

The memory card configured this way is mounted, through a memory card connector, in electronic devices such as digital cameras, portable music players, laptop computers and mobile telephones.

As a memory card connector, a memory card connector that has a lock mechanism for preventing the mounted memory card from falling or being pulled out is known, as disclosed in, for example, Patent Literature 1.

The lock mechanism in the memory card connector of Patent Literature 1 has: a slider that, when a memory card is inserted from a card insertion slot in the card accommodating space, moves forward by being pressed by the memory card; a lock claw that is supported by the slider and that, when the slider moves toward the card mounting location, engages with a concave part on the side of the memory card and locks the memory card in the card mounting location; an ejecting coil spring that urges the slider in the direction of removal; and a lock pin that engages with a heart cam formed in the slider and that holds the slider in the mounting location.

The lock claw is supported by the slider to latch with the concave part when the slider is located on the card insertion location side. This memory card connector has a plate spring provided to project toward inside the card accommodating space, from the plate that forms the top face of the card accommodating space. By means of this plate spring, the slider is located on the card insertion location side, and the memory card, which is released from a latched state with the lock claw, is pressed against the bottom face and is held in a half-lock state.

CITATION LIST

Patent Literature

PTL 1: Patent 2003-86293

SUMMARY OF INVENTION

Technical Problem

However, with a conventional memory card connector, the plate spring of the plate defining the accommodating space presses against the memory card that is released from a latched state. Consequently, there is a problem that, when the memory card is inserted and removed, pressed marks (i.e. scratches) are left on the memory card.

Further, when the memory card is miniaturized and thereby is made thinner, there is a problem that it is difficult to compose lock claws as in a conventional way to be supported by the slider to engage with the memory card in the card mounting location. In this way, it is desired that the configuration of the memory card connector, miniaturized following miniaturization of the memory card, is simplified as much as possible, to improve the assemblability and reduce the cost. For example, if a very small memory card that has a flat rectangular shape and that has outer dimensions of 11 mm×15 mm×1 mm is mounted, there is a demand that pressed marks are not left on the memory card when the memory card is inserted and removed and the number of components of the lock mechanism including the lock claw, slider, coil spring and lock pin is reduced.

It is therefore an object of the present invention to provide a memory card connector that allows a memory card to be inserted and removed without leaving marks of insertion and removal, that prevents the memory card from popping out when the memory card is removed, and that can be easily miniaturized with a simple configuration.

Solution to Problem

One aspect of the memory card connector according to the present invention achieves the above object by including: a connector unit that comprises: a container, in which a memory card having a notch part in one side, is removably inserted through a card insertion slot; and a connecting terminal that connects with an electrode of the memory card accommodated in the container; a slider that is arranged movable along a direction of insertion of the memory card by a side of the container, that has a lock claw part engaging from the side with a concave part of the memory card inserted in the container, that moves along the direction of insertion together with the memory card inserted, that fixes the memory card accommodated in the container by the engagement of the lock claw part with the concave part and that makes the lock claw part detachable from the concave part by swinging the lock claw part in a horizontal direction in a location at the card insertion slot end that is the location the memory card is inserted halfway; an urging element that urges the slider in a direction of removal opposite from the direction of insertion; a pressuring element that presses the slider from above and regulates movement of the slider in the direction of removal; and a claw pressing element that presses the slider located at the card insertion slot end against the container in the horizontal direction and that engages the lock claw part detachably with the concave part of the memory card which is inserted halfway in the container.

ADVANTAGEOUS EFFECTS OF INVENTION

The present invention can realize a memory card connector that allows a memory card to be inserted and removed without leaving marks of insertion and removal, that prevents the memory card from popping out when the memory card is removed, and that can be easily miniaturized with a simple configuration.

DESCRIPTION OF EMBODIMENTS

An embodiment of the present invention will be described below with reference to the accompanying drawings.

Figure 1:
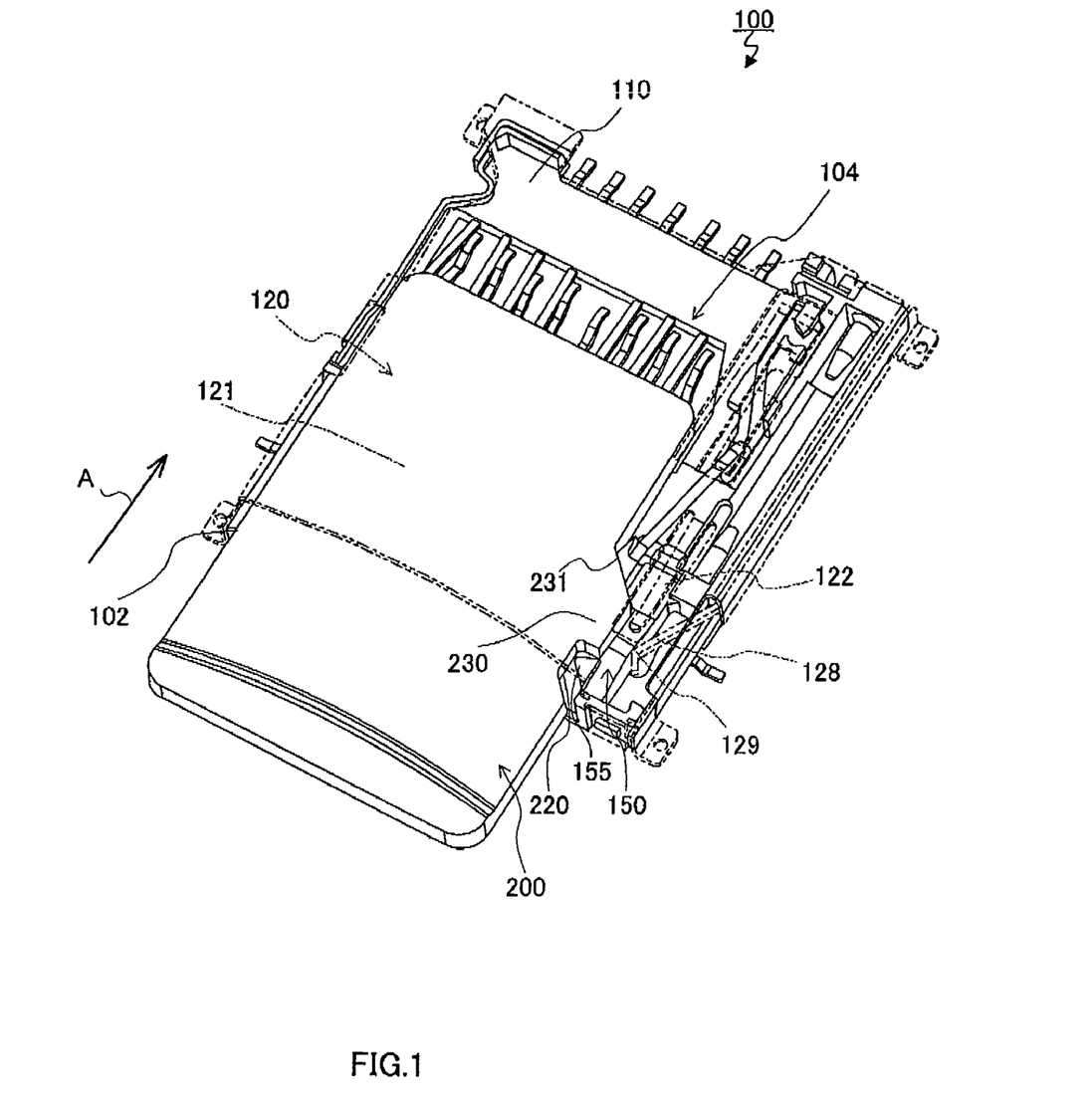
FIG. 1 is a perspective external view showing a configuration of the memory card connector according to one embodiment of the present invention.

FIG. 1 is a perspective external view showing a configuration of the memory card connector according to one embodiment of the present invention. Further, for ease of description, FIG. 1 shows a state where the top face of the memory card connector is made transparent. Furthermore, coil spring 160 (see FIG. 2) is provided in the memory card connector of the present embodiment to urge slider 150 as described below, but is not illustrated in FIG. 1.

Memory card connector (hereinafter "connector") 100 shown in FIG. 1 has the shape of a thin plate that is virtually rectangular when seen from a plane view, and has inside container 104 for accommodating memory card 200 which is removably inserted from card insertion slot 102.

Further, memory card 200 is formed in prescribed dimensions and shapes according to the types of memory card 200, and the memory card connector 100 of the present embodiment matches the dimensions and shape of the memory card used.

Memory card 200 mounted in memory card connector 100 has a flat rectangular shape and outer dimensions of 11 mm×15 mm×1 mm. The width of memory card 200 at the front end is made narrower than the width at the rear end, 11 mm, and a plurality of electrodes are provided in the bottom face.

Further, in memory card 200 mounted in connector 100 of the present embodiment, notch part 220 that opens laterally is provided in one side (in the right side view, where the direction of insertion viewed from the memory card 200 is the front end). Furthermore, in one side of memory card 200, projecting part 230 that forms the side wall part of notch part 220 in the front end is formed. The exterior of this projecting part 230 at the front end forms inclined face 231 that rises rightward, from the front end of memory card 200 toward the base end.

The connector unit of connector 100 is formed by covering rectangular housing 110 formed with an insulating material (an insulating synthetic resin material in this case), with shield cover 120 that is formed with a conductive material, both end parts of which are bent in the shape of the letter L (a metal plate in this case).

Figure 2:
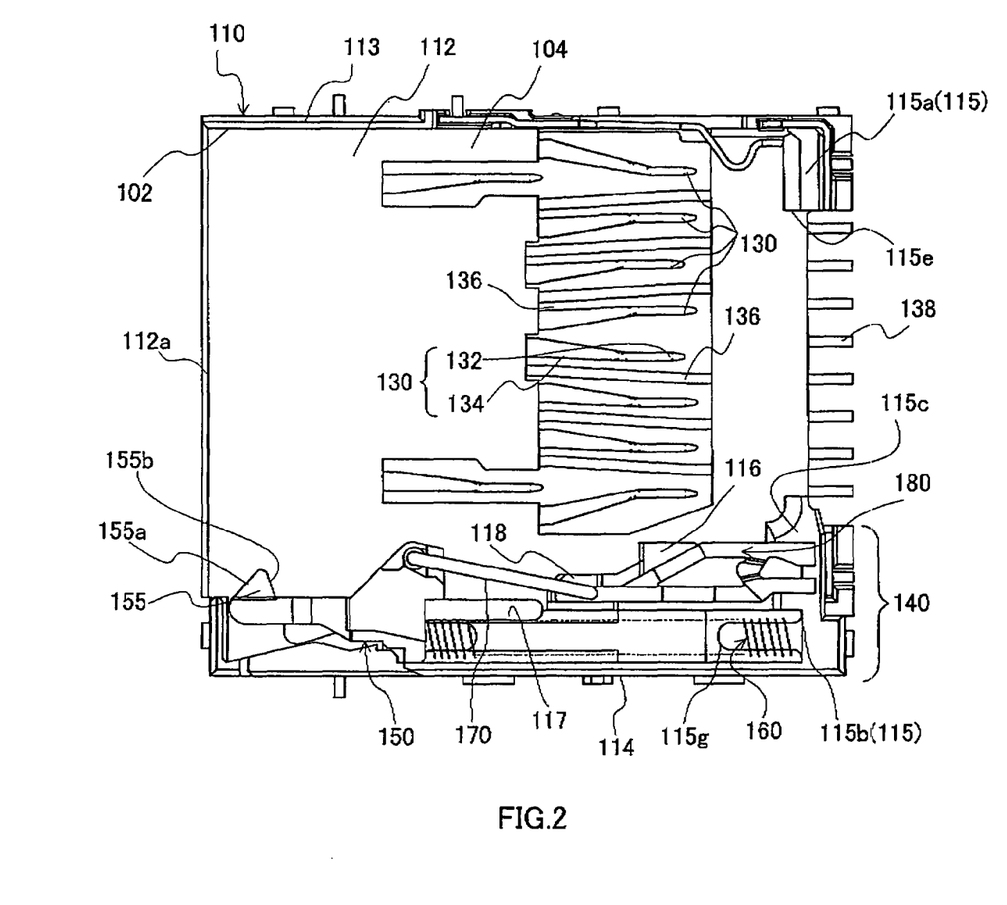
FIG. 2 is a plane view of a housing without a shield cover in the memory card connector according to one embodiment of the present invention.
Figure 3:
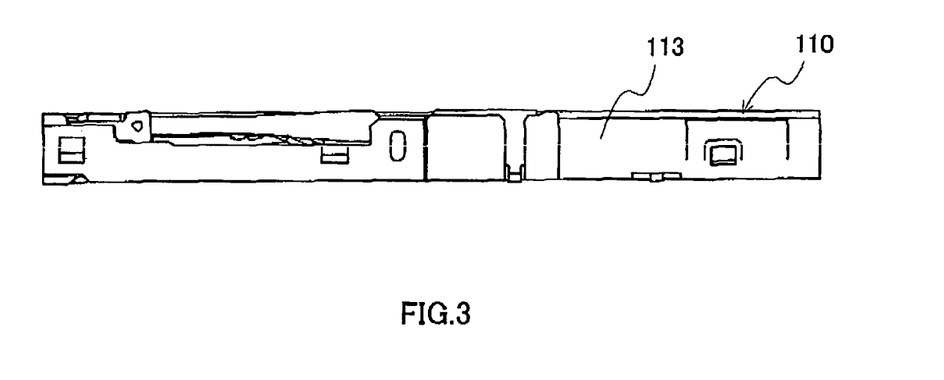
FIG. 3 is a right side view of the housing shown in FIG. 2.
Figure 4:
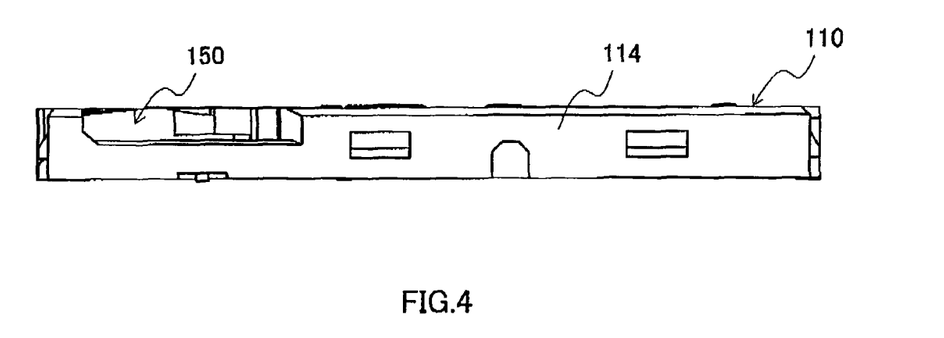
FIG. 4 is a left side view of the housing shown in FIG. 2.
Figure 5:
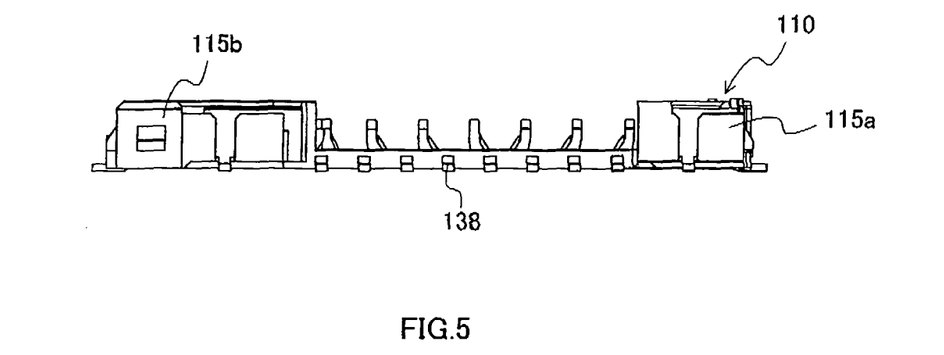
FIG. 5 is a rear view of the housing shown in FIG. 2.

FIG. 2 shows a plain view of the housing without the shield cover in the memory card connector according to one embodiment of the present invention. FIG. 3 shows a right side view of the housing shown in FIG. 2. FIG. 4 shows a left side view of the housing shown in FIG. 2. FIG. 5 shows a rear view of the housing shown in FIG. 2.

As shown in FIG. 2 to FIG. 5, housing 110 has bottom plate part 112 that is virtually rectangular from a plane view and that is provided with contacts 130, guide side wall part 113 and side wall part 114 that are set upright from both side parts adjacent to front side part 112a, which is the opening rim of card insertion slot 102, and that are spaced apart facing each other in bottom plate part 112, and rear end wall part 115 that is set upright from the rear end side part opposite from card insertion slot 102 in bottom plate part 112.

As shown in FIG. 2, in bottom plate part 112, lock mechanism part 140 having a slider that is movable along the direction of insertion, is provided along side wall part 114. Further, between this lock mechanism part 140 and guide wall part 113, small guide wall part 116 that faces the other side of memory card 200 inserted (hereinafter simply "card") and that abuts on the rear end part of slider 150.

Small guide wall part 116 has an opposing face and an abutting face, where the opposing face is arranged parallel with the interior of guide side wall part 113 and faces the side of the inserted card and regulates the location of this card from the side, and the abutting face is arranged orthogonal to the opposing face and abuts on slider 150 when the slider moves backward to the rearmost part.

Further, this small guide wall part 116 regulates the insertion of lock mechanism part 140 in heart cam groove part 180 when card 200 (see FIG. 1) is inserted in container 104.

These guide side wall part 113, bottom plate part 112, the part facing guide side wall part 113 in lock mechanism part 140 and small guide wall part 116 form a concave shape that opens toward the upper face of housing 110, and form both sides and the bottom face of container 104.

Rear end wall part 115 is arranged close to and facing the front end part of card 200 that is inserted and accommodated in container 104, and regulates the movement of inserted card 200 in container 104, in the direction of insertion.

Opening 115e that communicates with container 104 in the direction of insertion, is formed in virtually a center part of rear end wall part 115, and wall parts 115a and 115b that form the rear end corner parts of housing 110 are arranged on both sides of this opening 115e.

In these wall parts 115a and 115b, guide piece 115c that is set upright on bottom plate part 112 and that projects forward, is formed in wall part 115b on the side of lock mechanism part 140.

Guide piece 115c is arranged closer to guide side wall part 113 than lock mechanism part 140 arranged along the direction of insertion on bottom plate part 112, and accommodates one side rim part at the front end of card 200. To match the shape of memory card 200 inserted, the interval between guide piece 115c and guide side wall part 113 is provided such that this interval is narrower than the interval between guide side wall part 113 and lock mechanism part 140.

These guide side wall part 113 and guide piece 115c limit the width of the front end of card 200. By this means, it is possible to accurately adjust the locations of the electrodes of card 200 and contacts 130 arranged in bottom plate part 112 of the housing.

A plurality of contacts (for example, cantilever contacts) 130 are aligned in bottom plate part 112 of housing 110 such that the tip parts serving as contact parts 132 oppose card insertion slot 102, and contact electrically with the electrodes of card 200 accommodated.

Contact 130 is formed with a plate spring contact. Contact 130 is arranged to project to the back from the upper face of bottom plate part 112, along the direction of insertion of card 200 inserted, and has lever part 134 the tip of which serve as contact part 132. Lever parts 134 are arranged in bottom plate part 112, such that contact parts 132 of the tips are aligned at the end of rear end wall part 115 of housing 110, in the direction orthogonal to the direction of insertion of card 200.

Contact 130 is formed by processing a long strip-shaped metal plate processed in the shape of the letter V or U from the plane view. Assume that one side part folded back at the folding back portion of this metal plate is lever part 134 and the other side part is fixed strip 136 arranged in bottom plate 112. Contact 130 is formed by bending lever part 134 toward the surface with respect to fixed strip 136.

Fixed strip 136 is arranged in bottom plate part 112, parallel with the bottom face, and base end part (the base end part of contact 130) 138 of fixed strip 136 projects outward (backward) from the rear end face of rear end wall part 115. This projecting base end part 138 serves as the lead part that is solder-joined with the mounting substrate.

Contact 130 is formed integrally with housing 110 by insertion molding, and the base end side parts and the front end side parts (the folded back portion of contact 130) of the fixed strip 136 are embedded in bottom plate part 112 of housing 110.

Lock mechanism part 140 is arranged in the side of the area that serves as container 104 and has slider 150 with lock claw part 155 that engages with the notch part of the memory card inserted, coil spring 160, lock pin 170 and heart cam groove part 180.

Slider 150 is movable along the direction of insertion of card 200 inserted in container 104, is arranged swingably in a location at the card insertion slot end, and is urged toward the opposite direction from the direction of insertion (i.e. removing direction) of card 200 by coil spring 160, which is the urging element.

This slider 150 holds card 200 removably by engaging lock claw part 155 with notch part 220 of memory card 200 in a location at the card insertion slot end of when slider 150 moves to the frontmost end (i.e. a location at card insertion slot 102 end of connector 100). Hereinafter, this location will be referred to as a "half-lock location."

Figure 6:
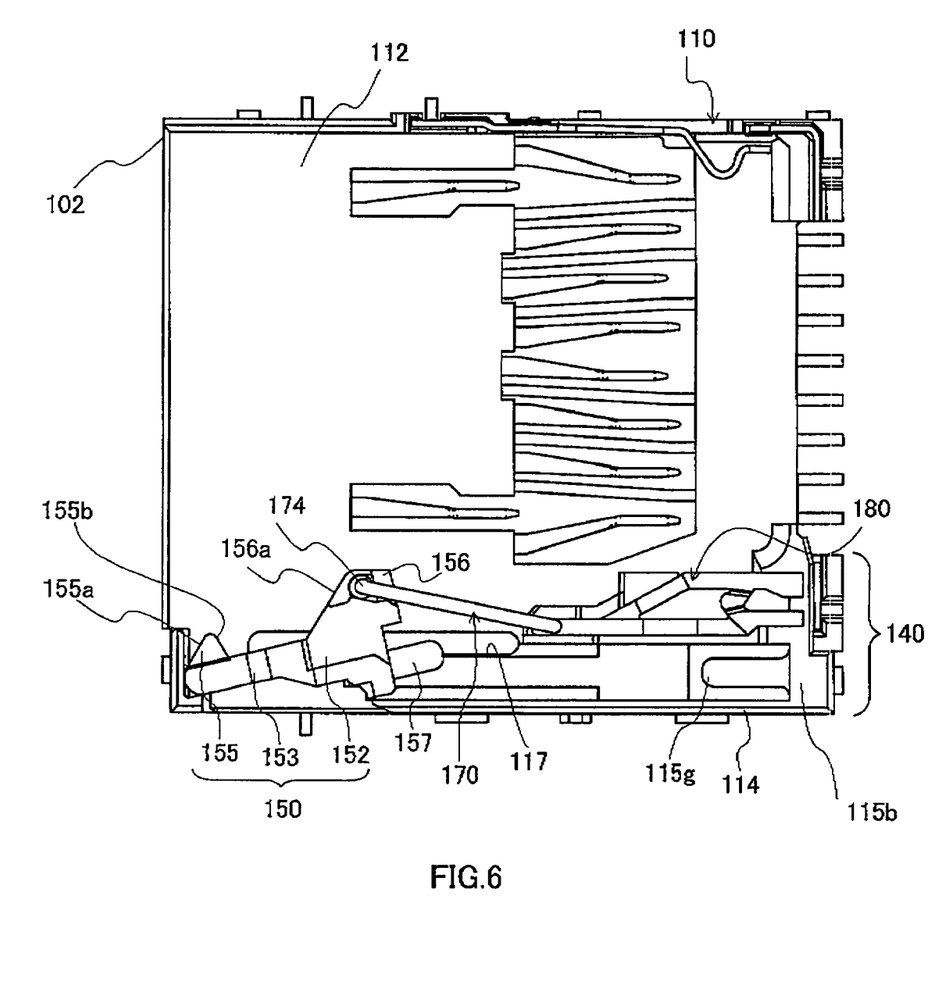
FIG. 6 is a plane view of the housing without a coil spring in the housing shown in FIG. 2.
Figure 7:
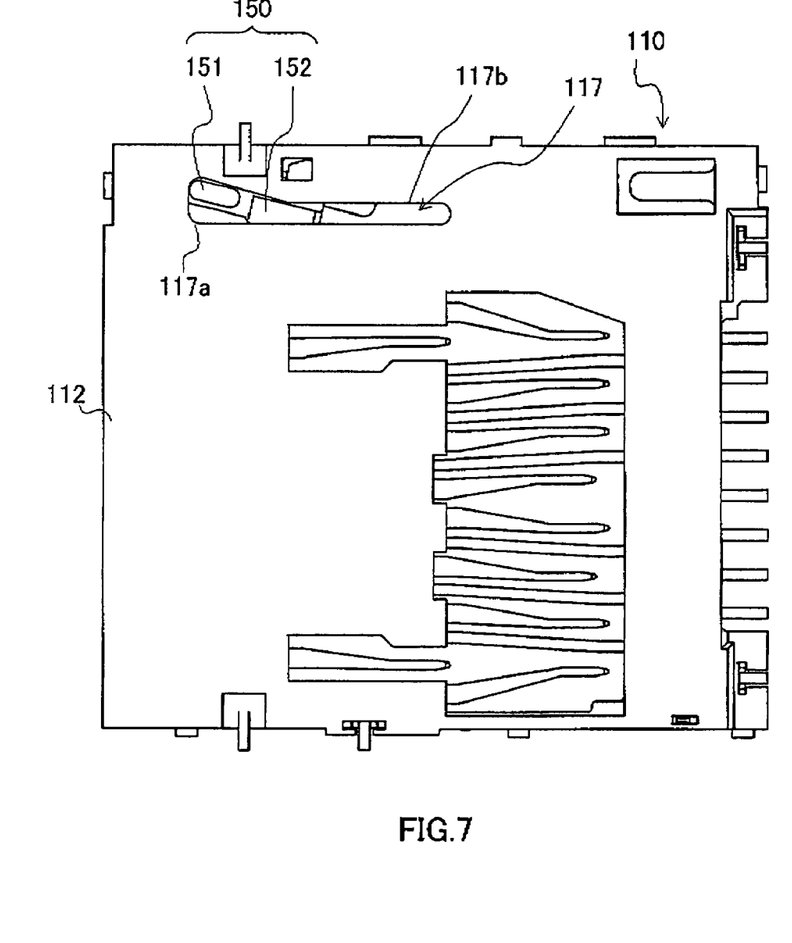
FIG. 7 is a bottom view of the housing shown in FIG. 6.

FIG. 6 is a plane view of the housing in a state where coil spring 160 is removed from the housing shown in FIG. 2, and illustrates a state where slider 150 is moved from the engaging location with memory card 200. Further, FIG. 7 shows a bottom view of the housing shown in FIG. 6. Slider 150 shown in these FIG. 6 and FIG. 7 is tilted and is arranged in a location where lock claw part 155 is moved from the engaged location with notch part 220 of card 200.

As shown in FIG. 6 and FIG. 7, slider 150 has slider unit 152 arranged on bottom plate 112.

On the bottom face of this slider unit 152, guide projecting part 151 (see FIG. 7) that projects downward is movably fit loose in slit 117 formed in bottom plate 112.

Further, in slider 150, neck part 153 is formed to project forward from slider unit 152. At the tip of this neck part 153, lock claw part 155 that engages and disengages with notch part 220 formed in the side of card 200, is formed.

Guide projecting part 151 forms a projection that extends in the direction of insertion (i.e. longitudinal direction), and is longer in the longitudinal direction than in the width direction, in the bottom face of slider unit 152. Guide projecting part 151 is guided by slit 117 and moves in slit 117 extending in the longitudinal direction in housing 110.

As shown in FIG. 7, slit 117, in which guide projecting part 151 is fit loose, is formed in bottom plate part 112, to extend in the longitudinal direction of housing 110, and the end part at card insertion slot 102 end widens toward the side opposite from container 104.

In slit 117, front end part 117a on the card insertion slot 102 side is made in the shape of a fan that widens laterally, and, when guide projecting part 151 is located at this fan-shaped part 117a, guide projecting part 151 is swingable about the base end part side.

Further, guide projecting part 151 moves linearly along long slit part 117b when guide projecting part 151 moves toward the depths of slit 117, and, at the end part of the depths of long slit part 117b, movement is regulated in the horizontal direction and toward the base end.

Back to FIG. 6, lock claw part 155 of slider 150 is formed in a triangular shape from a plane view, projecting from the front end part of neck part 153. In lock claw part 155, face 155b facing the rear end has a steep gradient with respect to the inner side of the neck part to latch with rectangular notch part 220 of card 200 toward the rear end in a reliable manner, and face 155a facing the front end has a moderate gradient to allow smooth engagement and disengagement with notch part 220.

Further, in slider 150, spring bearing projection 157 and the exterior of which is fit around by the end part of coil spring 160 (see FIG. 2) and which projects backward from slider unit 152 is formed, and pin holding part 156 that rotatably holds front end part (i.e. other end part) 174 of lock pin 170, which has base end part (i.e. one end part) 172 joined with heart cam groove part 180.

As shown in FIG. 2, coil spring 160 is a compression coil spring and is arranged between slider 150 and rear end wall part 115b along the direction of insertion, to make the other end part fit around the exterior of projecting part 115g that projects forward from rear end wall part 115b.

By this means, slider 150 is urged forward at all times, and, when card 200 is not inserted in container 104, is arranged in a location at the card insertion slot end where the frontmost movement terminates, in a state where lock claw part 155 projects toward inside container 104, that is, lock claw part 155 lies along the direction of insertion.

Further, in pin holding part 156 shown in FIG. 6, a hole part is formed in the surface of the part projecting toward container 104 from slider unit 152. A bending axis that forms front end part (i.e. other end part) 174 of U-shaped lock pin 170 formed by bending both end parts of the round stick is inserted turnable in this hole part.

This pin holding part 156 is formed so as to project from the side of container 104 in the rear end part of slider unit 152, toward container 104, and inclining part 156a that abuts on inclined face 231 of projecting part 230 of card 200 is formed on the card insertion slot 102 side. Inclining part 156a is an inclined plane that crosses with the direction of insertion and is pressed in the direction of insertion by card 200 that is inserted in container 104. By this means, by only inserting memory card 200 toward the depths of container 104, slider 150 follows this and consequently moves toward the depths of container 104, that is, to the location where card 200 is accommodated in container 104.

The bending axis part that forms base end part (i.e. one end part) 172 of lock pin 170 is inserted in heart cam groove part 180, and this lock pin 170 is a follower of heart cam groove part 180. By this means, slider 150 and lock pin 170 follow the trajectory of heart cam groove part 180 and are shifted relative to each other.

Further, in slider 150, the upper face of slider unit 152 is formed to become lower than neck part 153 and pin holding part 156, to prevent interference with upper face 121 (see FIG. 1) of shield cover 120 arranged above.

Figure 8:
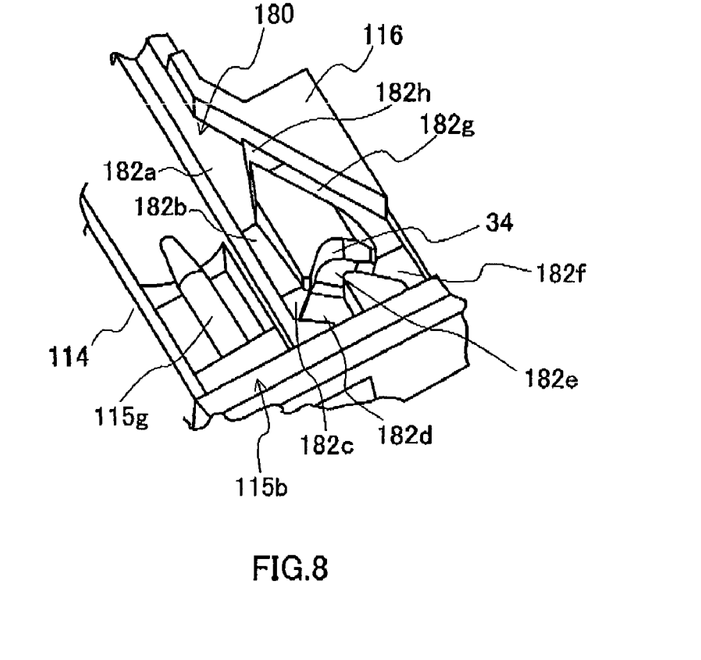
FIG. 8 illustrates a heart cam groove part and is a partial enlarged perspective view showing the heart cam part viewed from behind.
Figure 9:
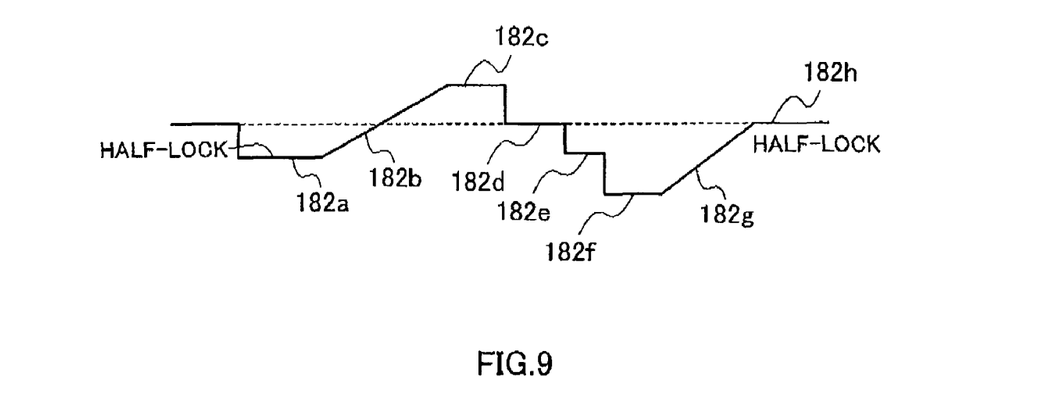
FIG. 9 shows the relationships between the heights of stepwise inclined planes in the heart cam groove part shown in FIG. 8 and stages in the memory card connector in the vertical direction.

FIG. 8 illustrates heart cam groove part 180 and is a partial enlarged perspective view showing the heart cam part from behind. FIG. 9 shows the relationship between the heights of stepwise inclined planes of the heart cam groove part 180 shown in FIG. 8 and stages in the memory card connector in the vertical direction.

In the bottom face of this heart cam groove part 180, a plurality of stepwise slopes and stages 182a to 182f are formed such that base end part 172 of lock pin 170 that rotatably connects front end part 174 with slider 150 is guided to a predetermined direction, which composes what is called a heart lock cam mechanism. The relationship between the heights of slopes 182a and 182f in which base end part 172 of lock pin 170 starts from the half-lock location and returns to the half-lock location is formed as shown in FIG. 9.

The slopes and stages 182a and 182f are formed such that the other end part of abutting lock pin 170 does not draw the backward trajectory.

As shown in FIG. 8, bottom face 182a which serves as a starting point of the trajectory in heart cam groove part 180 is a plane that is parallel with the bottom face of slider 150. Then, slope 182b that serves as an inclined plane is formed to rise from bottom face 182a.

Past slope 182b that forms an inclined plane that serves as the bottom face, there is bottom face 182c which is a plane higher than bottom face 182a. Past bottom face 182c, there is a step and then is curved bottom face 182d, which is a plane lower than bottom face 182c.

That is, in the process slider 150 moves to the card fixing location from the location on the card insertion slot side, if base end part 172 of lock pin 170 reaches bottom face 182d, bottom end part 172 cannot return to bottom face 182c. Past bottom face 182d, there is a step and then is bottom face 182e, which is a plane lower than bottom face 182d.

Bottom face 182e forms a V-shaped groove with inner walls having a shape of the letter V from a plane view and projecting toward the card insertion slot. In the process slider 150 moves to the card fixing location from the location on the card insertion slot side, if bottom end part 172 of lock pin 170 reaches bottom face 182e, bottom end part 172 cannot return to bottom face 182d. The state where bottom end part 172 reaches bottom face 182e of V-shaped groove 34 refers to the state card 200 is locked or mounted. Further, the trajectory which base end part 172 draws from bottom face 182a to bottom face 182e, is the forward trajectory.

When card 200 is inserted toward the depths of connector 100, that is, when card 200 is inserted to the back, against the urge of coil spring 160, bottom end part 172 of lock pin 170 is released from V-shaped groove 34, there is a step past bottom face 182e and bottom end part 172 is located in bottom face 182f, which is a plane lower than bottom face 182e. That is, bottom end part 172 that has reached bottom face 182f cannot return to bottom face 182e.

Further, bottom face (slope) 182g that serves as an inclined plane inclined toward the direction of insertion of the card, is formed to rise from bottom face 182f continuing from bottom face 182f.

At the insertion slot end of slope 182g, bottom face 182h, which is a plane higher than slope 182g is formed. At card insertion slot 102 end of this bottom face 182h, a step is formed and bottom face 182a, which is a plane lower than bottom face 182h, is arranged.

In this way, heart cam groove part 180 is configured such that the contact point of lock pin 170 that slides on the bottom face draws a heart-shaped planar trajectory and draws a partly irreversible trajectory in the height direction.

Further, in connector 100, heart cam groove part 180 is arranged between the front end part of the memory card accommodated in container 104 and the coil spring that extends in the direction of insertion along one side of connector 100 (i.e. the right side face when viewing card insertion slot 102 from the front).

That is, container 104 and lock mechanism part 140 including coil spring 160 that urges slider 150 and heart cam groove part 180 are settled on housing 110 in an efficient arrangement.

The width of the length of connector 100 is formed close to a width of a length combining the width of memory card 200 and the width of lock mechanism part 140, so that miniaturization and a smaller space for mounting the memory card are realized in connector 100.

Upper face 121 (see FIG. 1 and FIG. 10) of shield cover 120 covering housing 110 from above regulates the movement of slider 150, arranged on bottom plate part 112 of housing 110 with the above configuration, toward the vertical direction, and allows movement in the longitudinal direction and in the horizontal direction in front end part 117a of slit 117.

Figure 10:
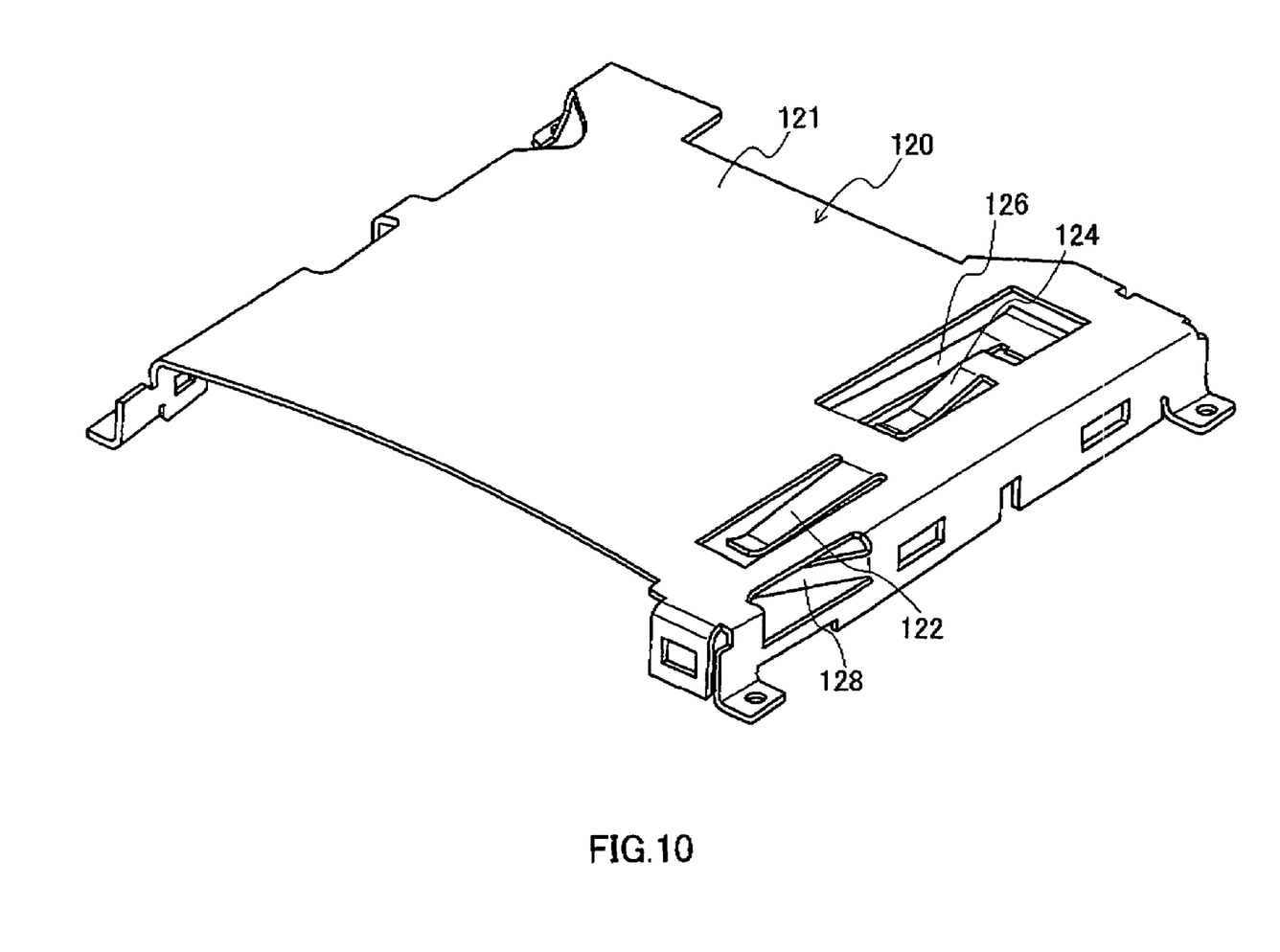
FIG. 10 is a perspective view of the shield cover of the memory card connector according to the present embodiment.

FIG. 10 shows a perspective view showing the shield cover of the memory card connector according to the present embodiment.

In upper face 121 of shield cover 120, slider pressuring piece 122 that applies pressure from above to slider 150 moving in the direction of insertion in shield cover 120 and that contacts with slider 150 is provided.

Further, upper face 121 of shield cover 120 is provided with pin pressuring pieces 124 and 126. Pin pressuring pieces 124 and 126 apply pressure from above to lock pin 170 (see FIG. 2) that moves in association with slider 150, presses lock pin 170 against heart cam groove part 180 and makes lock pin 170 slide on the bottom face of heart cam groove part 180.

Further, claw pressing piece 128 is provided in the side of shield cover 120. Claw pressing piece 128 presses slider 150, which is located swingably in the horizontal direction, against container 104, and engages lock claw part 155 with notch part 220 of card 200.

This slider pressuring piece 122 urges slider unit 152 of slider 150, which moves in the direction of insertion, downward at all times and presses slider 150 against bottom plate part 112.

Slider pressuring piece 122 is formed by processing the part in upper face 121 of shield cover 120 forming an upper face part of the moving area of slider 150. To be more specific, slider pressuring piece 122 is a plate spring element formed by making a notch in the upper face of shield cover 120 and bending the piece to extend downward from the back to the front.

This slider 150 is configured to be movable in the longitudinal direction in a state where slider 150 is pressed at all times in housing 110 (see FIG. 1).

Pin pressuring pieces 124 and 126 are formed by processing parts facing the upper face of heart cam groove part 180, in upper face 121 of shield cover 120. Further, heart cam groove part 180 is located behind the part where slider pressuring piece 122 is formed.

Pin pressuring pieces 124 and 126 are configured with first pin pressuring piece 124 and second pin pressuring piece 126, which are plate springs that extend at a downward angle from upper face 121 of shield cover 120.

First pin pressuring piece 124 presses lock pin 170 downward and makes bottom end part 112 of lock pin 170 slide on the bottom face to slope 182b in heart cam groove part 180. Further, second pin pressuring piece 126 presses lock pin 170 downward and makes bottom end part 172 of lock pin 170 slide from bottom face 182d to bottom 182e, which is a V-shaped groove, and from bottom face 182e to bottom face 182a.

That is, bottom faces of these first pin pressuring piece 124 and second pin pressuring piece 126 each contact the upper part of lock pin 170 which moves along the bottom face of heart cam groove part 180, and press lock pin 170 from above against the bottom face of heart cam groove part 180.

Claw pressing piece 128 is formed with a long, elastic strip element formed by processing part of the side part of shield cover 120 and is formed with a plate spring in this case. To be more specific, claw pressing piece 128 is formed by cutting out the part at the card insertion slot end in the side part of shield cover 120 formed by processing a metal plate from the rear end toward the card insertion slot end so as to project toward the interior of shield cover 120.

The front end part of claw pressing piece 128 is bent inward, that is, bent to project toward container 104, and the top part of bending piece 129 (see FIG. 1) presses the side of slider 150 against container 104.

In this way, claw pressing piece 128 presses slider 150 that is pushed forward by coil spring 160, toward container 104, in the location at the card insertion slot end. Consequently, slider 150, located at the card insertion slot end, is swingably arranged against the pressing force of claw pressing piece 128 in a state where lock claw part 155 is projected toward inside container 104.

That is, in memory card connector 100, slider 150 that is urged forward by coil spring 160 and that is located at the card insertion slot end is pressed downward by slider pressuring piece 122 and pressed against container 104 by claw pressing piece 128.

In this way, if card 200 is inserted in container 104 by locating slider 150 in the location at the card insertion slot end, the point of lock claw part 155 elastically deforms and engages detachably with notch part 220 of card 200. By this means, card 200 is held (half-locked) removably.

Further, slider pressuring piece 122 is pressured with slider 150 located on the card insertion slot side. Consequently, when slider 150 returns to the location at the card insertion slot end from the location the card is held, which is the rearmost location inside container 104, by the urge of coil spring 160, that is, when the card is ejected, slider pressuring piece 122 and, mainly, claw pressing piece 128 are able to attenuate the traveling force of slider 150 resulting from the urge.

In this way, claw pressing piece 128 together with slider pressuring piece 122 and lock claw part 155 of slider 150 composes a mechanism for preventing card 200 from popping out upon ejection. With the present embodiment, claw pressing piece 128 applies pressure to slider 150 in the horizontal direction, and slider pressuring piece 122 applies pressure to slider 150 in the vertical direction. That is, claw pressing piece 128 and slider pressuring piece 122 press slider 150 that moves in the direction of insertion, in the direction orthogonal to the direction of insertion, so that the traveling force in the direction of insertion is suppressed effectively.

Further, slider pressuring piece 122 and claw pressing piece 128 are formed with the same material as shield cover 120 by processing a part of shield cover 120. By this means, it is possible to reduce the number of parts compared to a case where connector 100 is formed with separate entities, namely, shield cover 120, slider pressuring piece 122 and claw pressing piece 128 separately.

Next, the operation of inserting and removing card 200 in and from the memory card connector configured as described above and the operation of lock mechanism 140 part will be described.

In the card connector in which card 200 is not inserted, slider 150 is urged at the front of the connector by coil spring 160 and is urged toward container 104 by claw pressing piece 128 (see FIG. 1 and FIG. 2).

In this way, the movement of slider 150 is regulated in the vertical direction by bottom plate part 112 and upper face 121 of shield cover 120, and so guide projecting part 151 in the bottom face is pressed against the front end part of slit 117 at the front end and is pressed against container 104 at front end part 117a of slit 117. Consequently, slider 150 is arranged at a location at the card insertion slot 102 end swingably in the horizontal direction opposite from the container, in a state where suppressing lock claw part 155 projects inside container 104 (see FIG. 2).

Further, in this state, base end part 172 of lock pin 170 inserted in heart cam groove part 180 may be latched with the front end part of bottom face 182a.

Card 200 is inserted in the memory card connector of this state by tucking in card 200 from card insertion slot 102.

Then, the end face of lock claw part 155 facing the opening end in container 104 is pressed by the end part of card 200 in the direction of insertion and slider 150 swings in the horizontal direction opposite from container 104. By this means, lock claw part 155 is shifted in the direction apart from card 200, sliding on the side of card 200 inserted in container 104.

Further, lock claw part 155, which slides on the side of card 200 when card 200 is inserted, engages with notch part 220 by sliding on the exterior of projecting part 230 on the side face of card 200 and enters notch part 220, and holds card 200 removably in a half-lock state.

In the state of the memory card connector shown in FIG. 1, if card 200 is inserted further in the direction of arrow A in this figure against the urge of coil spring 160, slit 117 guides slider 150 to move in the direction of insertion, maintaining lock claw part 155 engaged with notch part 220. Slider 150 moves toward the rear end of the connector following the movement of card 200, fits the exterior around projecting rail 118 (see FIG. 2) that has a concave part in the bottom face (not shown) continuing to bottom face 182a of the heart cam groove, and moves along the rail.

In this state, bottom end part 172 of lock pin 170 (i.e. the bending axis) moves on the bottom face of heart cam groove part 180 in the forward direction (the direction from bottom face 182a to bottom face 182d, passing slope 182b and bottom face 182c).

When slider 150 is inserted toward the depths, base end part 172 of lock pin 170 is dropped from a step of bottom face 182c, upon bottom face 182d. Consequently, base end part 172 of lock pin 170 cannot pass bottom face 182c and return to slope 182b. Further, if card 200 stops being tucked (the press in the direction of insertion), base end part 172 of lock pin 170 is pressed back against the card insertion slot by the urge of the coil spring, is moved to bottom face 182*e* and is engaged with V-shaped groove 34. By this means, the movement of slider 150 in the direction of removal by the urge of the coil spring is regulated, so that slider 150 is fixed in the location for mounting card 200. That is, card 200 is mounted.

Figure 11:
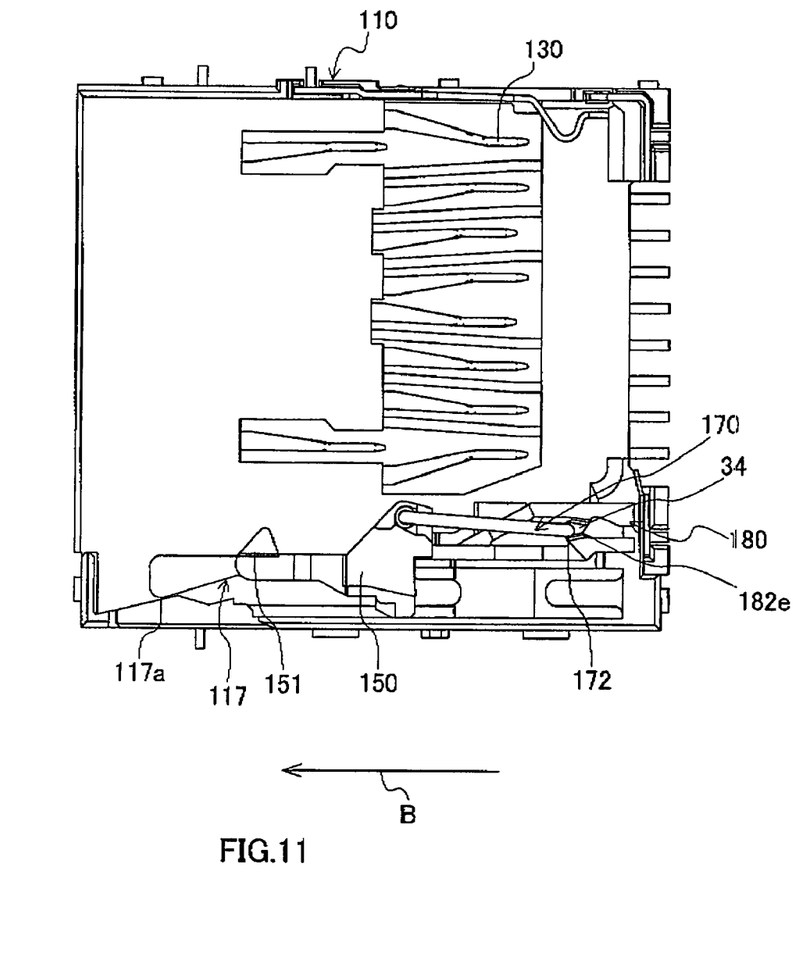
FIG. 11 is a plane view showing a state where the slider is located in the card mounting location in the housing of the memory card connector.

FIG. 11 shows a plane view showing the state where the slider is located in the card mounting location in the housing of the memory card connector according to one embodiment of the present invention. Further, for ease of description, the coil spring is not shown in FIG. 11.

In the state where base end part 172 of lock pin 170 engages with V-shaped groove 34 as shown in FIG. 11, slider 150 is fixed in the card mounting location in connector 100.

When slider 150 is located in the card mounting location shown in FIG. 11 in this way, the electrodes in the bottom face of the front end of the mounted card touch a plurality of contacts (cantilever contacts) 130, so that data can be read from and written in card 200. Further, lock claw part 155 enters and engages with notch part 220 of card 200, and so card 200 does not easily drop off the connector due to vibration.

Next, the operation of removing card 200 will be described.

When card 200 is removed by releasing the lock state, card 200 in the card mounted state is further tucked toward the depths of the connector.

In this way, in a state where card 200 is mounted, when card 200 is further inserted in the direction of insertion against the urge of the coil spring, base end part 172 (i.e. the bending axis) of lock pin 170 is released from V-shaped groove 34, as shown in FIG. 8 and FIG. 9, and moves in heart cam groove part 180 drawing a backward trajectory. That is, base end part 172 of lock pin 170 cannot return to bottom face 182*d* and therefore moves to bottom face 182*f* and disengages from V-shaped groove 34, and passes slope 182*g* and bottom face 182*h* and draws the trajectory returning to bottom face 182*a* by the urge of the coil spring.

In this case, slider 150 moves in the direction of removal by the urge of the coil spring, and moves card 200 in the direction of removal indicated by arrow B of FIG. 11 by the press of the abutting face against the protrusion of card 200 in the direction of removal and by the press of lock claw part 155 against the side of notch part 220 in the direction of removal.

In this way, slider 150 moves from the location the card is fixed to a location at the card insertion slot end by the urge of the coil spring, and, nevertheless, is pressed downward by slider pressuring piece 122 and so moves while the speed of movement is being suppressed.

Further, the pressing force against card 200, that is, the force against the direction of removal, is applied to slider 150 from claw pressing piece 128, and so acceleration of movement in the direction of removal is further suppressed (see FIG. 1).

Further, in the location at the card insertion slot end, notch part 220 engages with lock claw part 155 detachably, so that card 200 is prevented from popping out in the direction of removal due to acceleration of movement of slider 150.

In this way, in the memory card connector of the present embodiment, when card 200 is ejected, the card is retained by urging lock claw part 155 of slider 150 toward notch part 220 of the card by claw pressing piece 128 (plate spring).

Further, when memory card 200 is ejected, the lock is released by flicking (pushing in the direction of insertion) the card in a locked state by the tip of the finger. In this case, the force of slider 150 and memory card 200 moving together in the direction of removal (the direction of ejection) at an accelerated speed is suppressed by claw pressing piece 128 and slider pressuring piece 122 that urges slider 150 downward.

By this means, memory card 200 ejected from the connector is not pressed directly, so that it is possible to prevent card 200 from popping out without leaving pressed marks on card 200.

Further, lock mechanism part 140 in the memory card connector is assembled by arranging slider 150 with lock claw part 155, the coil spring and lock pin 170 in predetermined locations in bottom plate part 112 of housing 110. By this means, the number of components is smaller than the conventional lock mechanism and the lock mechanism can be miniaturized at ease.

In this way, according to the present embodiment, when card 200 accommodated in container 104 is removed, base end part 172 of lock pin 170 is disengaged from V-shaped groove 34 by pressing card 200 in the direction of insertion. By this means, slider 150 moves toward the location at card insertion slot 120 end in the direction of removal by the urge of coil spring 160. Slider 150 moving in the direction of removal in this way is directly pressed by slider pressuring piece 122 and claw pressing piece 128 in the direction crossing the direction of movement, that is, in the direction orthogonal to the horizontal direction in this case, (in the horizontal direction and vertical direction with respect to slider 150), and so the traveling force of slider 150 is suppressed.

By this means, it is possible to insert and remove card 200 without leaving marks of insertion and removal on memory card 200, prevent card 200 from popping out by the urge of coil spring 160 particularly when card 200 is removed, and miniaturize connector 100 with a simple configuration at ease.

The memory card connector according to the present invention is not limited to the above embodiment and can be variously changed and implemented. Further, it naturally follows that the above present invention can be variously modified without departing from the spirit of the present invention and cover these various modifications of the present invention.

INDUSTRIAL APPLICABILITY

The memory card connector according to the present invention provides advantages of inserting and removing the memory card without leaving marks of insertion and removal, preventing the memory card from popping out when the memory card is removed and enabling miniaturization with a simple configuration at ease, and is useful as a memory card connector that mounts an extremely small memory card such as a flash memory chip.

The invention claimed is:

1. A memory card connector comprising:
  a connector unit that comprises:
    a container, in which a memory card having a notch part in one side, is removably inserted through a card insertion slot; and
    a connecting terminal that connects with an electrode of the memory card accommodated in the container;
  a slider that is arranged movably along a direction of insertion of the memory card by a side of the container; has a lock claw part that engages with a concave part of the memory card inserted in the container, from a side of the concave part; moves along the direction of insertion together with the memory card to be inserted; fixes the memory card accommodated in the container by an engagement of the lock claw part with the concave part; and makes the lock claw part detachable from the concave part by swinging the lock claw part in a direction orthogonal to the direction of insertion in the plan of the memory card, in a location at a card insertion slot end, the card insertion slot end being the location in which the memory card is inserted halfway;

an urging element that urges the slider in a direction of removal opposite from the direction of insertion;

a pressuring element that presses the slider from above the slider and regulates movement of the slider in the direction of removal; and a claw pressing element that presses the slider, which is located at the card insertion slot end, toward the container in the direction orthogonal to the direction of insertion in the plan of the memory card, and makes the lock claw part detachably engage with the concave part of the memory card which is inserted halfway in the container.

2. The memory card connector according to claim 1, wherein:
the connector unit comprises:
a housing that comprises:
the card insertion slot;
the container; and
the connecting terminal; and
a metal shield cover that covers the housing; and
the pressuring element is a plate spring element formed such that part of an upper face of the shield cover projects downward.

3. The memory card connector according to claim 1, wherein:
the connector unit comprises:
a housing that comprises:
the card insertion slot;
the container; and
the connecting terminal; and
a metal shield cover that covers the housing;
the shield cover comprises:
an upper face part that covers the housing from above; and
a side face covering part that hangs from one side of the upper face part and is arranged orthogonally to the direction of insertion in a plane of the memory card with respect to the slider above the housing along the direction of insertion in a location on an opposite side from the container; and
the claw pressing element is formed with a plate spring element that is provided projecting from the side face covering part toward the container.

4. The memory card connector according to claim 1, wherein:
in the slider, one end of a stick-shaped lock pin is connected with a heart cam groove part comprising a heart-shaped cam groove and other end of the lock pin is held rotatably;
when the slider moves along the direction of insertion to a location where the memory card is accommodated in the container, the lock pin engages with a V-shaped groove part of the heart cam groove part, so that movement of the slider in the direction of removal is regulated by the urging element; and
the heart cam groove part is provided in the connector unit deeper in the direction of insertion than the slider and closer to the container than the pressuring element.

5. The memory card connector according to claim 1, wherein the slider comprises a pressing face pressed in the direction of insertion by the memory card inserted.

* * * * *